United States Patent

[11] 3,547,423

| [72] | Inventors | Alfred L. Jenny<br>Pittsfield, Mass.;<br>James H. Curtis, Newark, N.J. |
|---|---|---|
| [21] | Appl. No. | 720,805 |
| [22] | Filed | April 12, 1968 |
| [45] | Patented | Dec. 15, 1970 |
| [73] | Assignee | General Electric Company<br>a corporation of New York |

[54] ELECTROLYTIC CAPACITOR AND ELECTROLYTE MATERIAL THEREFOR
14 Claims, 2 Drawing Figs.

[52] U.S. Cl. ..................................... 317/230,
        252/62.2
[51] Int. Cl. ..................................... H01g 9/00
[50] Field of Search ............................ 317/230,
        231, 233; 252/62.2

[56] References Cited
UNITED STATES PATENTS

| 2,036,669 | 4/1936 | Yngve | 317/230 |
| 2,084,046 | 6/1937 | Owen | 317/230 |
| 2,104,733 | 1/1938 | Brennan | 317/230 |
| 2,149,086 | 2/1939 | Craine | 317/230 |
| 2,155,086 | 4/1939 | Geargier | 317/230 |
| 2,759,132 | 8/1956 | Ross | 317/230 |
| 3,138,746 | 6/1964 | Burger et al. | 317/230 |

*Primary Examiner*—James D. Kallam
*Attorneys*—James J. Lichiello, Nathan J. Cornfeld, Melvin M. Goldenberg, Frank L. Neuhauser and Oscar B. Waddell ABSTRACT: An electrolyte for electrolytic capacitors which includes as the conducting species thereof the reaction product salt of an organic base, and an acid such as a mono, di, or tribasic organic acid, the hydroxy-substituted derivatives of these acids or an inorganic acid. The concentration of the salt in the electrolyte can be from about 0.1—25 percent by weight. The electrolyte exhibits a low vapor pressure and enhanced chemical stability at elevated temperatures.

PATENTED DEC 15 1970

3,547,423

INVENTORS:
JAMES H. CURTIS,
ALFRED L. JENNY,

BY James J. Lichiello
THEIR ATTORNEY.

ELECTROLYTIC CAPACITOR AND ELECTROLYTE MATERIAL THEREFOR

BACKGROUND OF THE INVENTION

1. Field of the Invention

The present invention relates to electrolytic capacitors, and more particularly to an improved electrolyte therefor.

2. Description of the Prior Art

Conventional electrolytes for electrolytic capacitors for effective operation up to about 100° C. generally contain a solvent, such as ethylene glycol, and a conducting species or ionogen. The ionogen employed is typically a borate such as ammonium pentaborate or ammonium biborate or to other substituted ammonium salts such as ammonium acetate and ammonium tartrate. For extended temperature devices, the conventional glycol solvent may be replaced by a highly polar, nonaqueous solvent but the same conducting species is generally retained.

A major drawback of these conventional electrolytes is their high vapor pressure at elevated temperatures, i.e., at about 125° C. This thermal instability result results in capacitors having unstable electrical properties. Additionally, the high vapor pressure increases leakage through the capacitor seals. When utilized in electrolytic capacitors having aluminum electrodes, the ammonia which is present in the vapor promotes chemical instability, pH reduction and resulting corrosion of aluminum.

SUMMARY OF THE INVENTION

It is, therefore, an object of the present invention to provide an electrolyte which exhibits a low vapor pressure and enhanced chemical stability at elevated temperatures.

It is another object of this invention to provide an electrolytic capacitor having stable electrical properties at elevated temperatures and increased reliability by virtue of the chemical stability and low vapor pressure of the electrolyte contained therein.

Other objects and advantage advantages will become apparent from the following description and appended claims:

In accordance with the objects of this invention, the disadvantages of conventional electrolytes are minimized or overcome by providing an electrolyte, for electrolytic capacitors, which includes a solvent and an ionogen wherein the ionogen is a thermally stable, conductive salt synthesized from an organic base and an organic or inorganic acid. The ionogen may be present in minimal but significant concentrations of from about 0.1 percent by weight to as much as about 25.0 percent by weight. An embodiment of the present invention contemplates an electrolytic capacitor containing this new electrolyte.

BRIEF DESCRIPTION OF THE DRAWINGS

The invention will be better understood from the following description taken in conjunction with the accompanying drawings.

DESCRIPTION OF THE PREFERRED EMBODIMENTS

Figure 1:
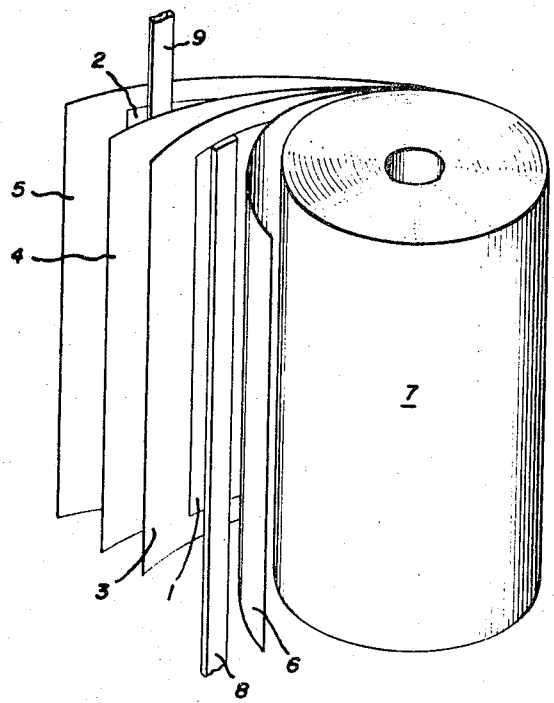
FIG. 1 illustrates a wound electrolytic capacitor section to which the present invention is applicable.

Referring now to the drawings, and in particular to FIG. 1, there is shown a partially unrolled exemplary capacitor roll section of conventional construction comprising a pair of electrode foils 1 and 2, at least one of which is made of tantalum, aluminum, or other suitable film-forming metal which may be advantageously, although not necessarily etched, and which has a dielectric oxide film thereon, the foils in the operation of the capacitor having opposite polarity. The dielectric oxide film may be produced by film-forming (usually anodizing) processes well known in the electrolytic capacitor art. Between foils 1 and 2 are sheets of dielectric spacer material 3, 4, 5, and 6 composed of cellulosic material, including paper made of vegetable fiber, such as Benares Hemp, or other suitable material of permeable or porous impregnatable nature. After the foils and sheets are wound in the form of a roll section 7, these sheets are usually impregnated with the electrolyte of the present invention. Terminals or tap straps 8 or 9 are secured to the respective electrode foils either before or during winding and extend in opposite directions from roll section 7. Roll section 7 is then inserted into the casing 10, as shown in FIG. 2.

Figure 2:
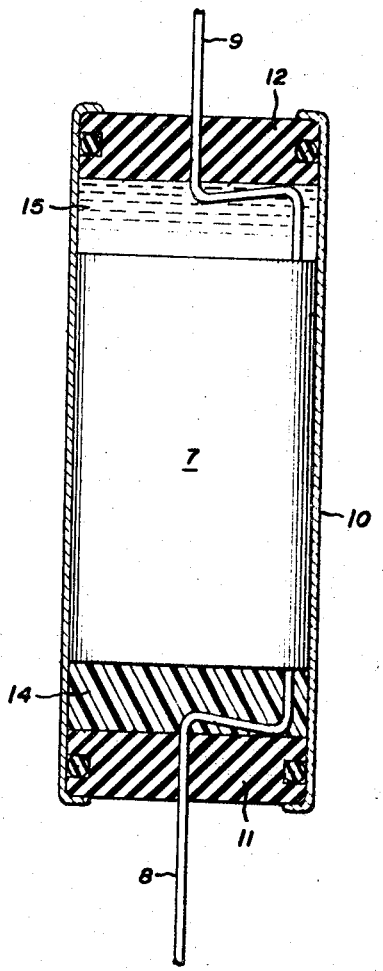
FIG. 2 illustrates a capacitor assembly with the capacitor section of FIG. 1 enclosed in a casing.

FIG. 2 shows the capacitor roll section 7 enclosed in a metal casing with terminals 8 and 9 extending respectively through insulating plugs or discs 11, 12 which provide a fluidtight seal with the interior of the casing. Roll 7 may be secured in the casing 10 by a potting compound 14 in the bottom of casing 10. Compound 14 may be a resin which is nonreactive with and insoluble in electrolyte 15 of the present invention. Alternatively, other mechanical techniques well known in art may be employed to stabilize the position of the roll 7 in casing 10. Electrolyte 15, as more fully described hereinafter, may fill casing 10.

In a polar type capacitor, only one of the electrode foils (anode) will have an anodic dielectric oxide film thereon. In a nonpolar capacitor both electrode foils will have such films thereon.

It should be understood that other types of electrolytic capacitors, employing an electrolyte such as is more fully described hereinafter, may be used in accordance with the present invention. For example, instead of the arrangement shown in FIGS. 1 and 2, wherein roll section 7 is formed by wound cathode and anode foils, roll section 7 may include only one electrode foil (anode) having a dielectric film thereon, the cathode being the outer casing. In such an arrangement, the casing is typically made of silver. Another well known type of capacitor which may employ the electrolyte of the present invention is the wire capacitor, wherein the anode is a film-forming wire having a dielectric oxide formed thereon.

The electrolyte of the present invention is composed principally of a solvent in which is dissolved a relatively minor portion of an ionogen. The ionogen is a thermally stable, conductive salt synthesized from an organic base and an organic or inorganic acid and may be prepared by a neutralization reaction which can be complete or partial as desired.

The organic bases suitable for use in the preparation of the ionogen of the present invention all have a characteristic in common, i.e., each contains a nitrogen atom, so that they may be broadly considered as substituted ammonia compounds. Examples of organic bases include generally the alkanolamines, substituted alkanolamines, tetramethyl guanidine, piperidine and others.

The acids suitable for use with the present invention are ordinarily those acids whose salts, resulting from reaction with an organic base, will support the formation of a dense oxide barrier layer (dielectric film) on the film forming electrode of the capacitor. These acids can be generally classified as saturated or unsaturated, aliphatic or aromatic, mono, di or tribasic organic acids, the hydroxy-substituted derivatives of these acids and inorganic acids such as boric, phosphoric, sulfuric, nitric, arsenic, tungstic, vanadic, telluric and the like. Since sulfuric and nitric acids will not support a dense oxide layer on an aluminum electrode, electrolytes containing conductive salts derived from these acids should ordinarily not be used in capacitors having aluminum electrodes.

In general, the synthesis of the conductive salts is accomplished by first mixing equal weights of base and water, and then adding acid until the pH reaches about 7.0 or less. The mixture is then heated to about 13 130° C. to remove water, complete the reaction and stabilize the material thermally. When cool the form of the materials vary from viscous liquid, glassy solid, semisolid or crystalline solid.

The electrolyte of the present invention may then be formed by adding the thus prepared conductive salt to a suitable solvent and dissolving it therein. At this point the mixture, if too alkaline, may be buffered by the addition of the acid component of the salt. If the electrolyte is to be used with aluminum electrodes, a desirable pH is in the range of about 5.5 to about 8. For added stability the entire electrolyte may be heated under reflux conditions at an elevated temperature to allow solvent/solute interaction, if any, to occur. A preferred method of preparing the electrolytes of the present invention consists of using the solvent as the reaction media and adding the acid and base thereto. The mixture is then heated for thermal stabilization and for reaction of the acid and base. By this technique, the electrolyte is prepared in a single step. It is particularly noteworthy that the electrolyte can be prepared in this manner because the neutralization reaction does not form water as a reaction product.

The solvents employed with the conducting salts to prepare the electrolyte of the present invention may be either aqueous or nonaqueous solvents but preferably should be polar materials. High polar solvents usually have higher dielectric constants, and greater dissociation with ultimately better solubility of salt therein. Nonpolar solvents, for example carbon tetrachloride, would be substantially less effective in dissolving the conductive salts described herein. In the event that the conductive salt is insoluble, or soluble only with difficulty in the chosen solvent, it may be dissolved in a mutually compatible second solvent and then incorporated to form the electrolyte. Examples of solvents which may be used to dissolve the conductive salts are water, ethylene glycol, dimethylformamide, dimethylacetamide, dimethyl or diethyl cyanamide, butyrolactone, n-methyl pyrrolidone, and others, as well as mixtures of any of these solvents. The type of solvent is chosen generally to satisfy the voltage and temperature conditions required by the particular applications of the capacitor.

The conductive salt as described is particularly useful when added in concentrations of from about 0.1 percent to about 25 percent by weight. The preferred concentration range depends upon the particular capacitor application but generally will be in the range of from 4 percent to 10 percent by weight.

The resulting electrolyte containing the conductive species, unless the solvent is water, is a substantially nonaqueous liquid. In such a case the only water which is present would be derived from the water of crystallization of the ionogen. As a result the usual problems associated with Al-water reaction at the cathode and hydration of the anodic film are eliminated. In another embodiment, although not preferred, the electrolyte could advantageously be a thermally reversible gel.

On the basis of the stoichiometry of the reactions, the following set of equations may be employed to define the reaction and the conductive salt reaction products:

$$NH_nX_{3-n} + HA = ANH_{n+1}X_{3-n} \quad (1)$$

$$2NH_nX_{3-n} + H_2A = A(NH_{n+1}X_{3-n})_2 \quad (2)$$

Equation (1) characterizes the reaction utilizing monobasic acids. Equation (2) is applicable to dibasic acids. A similar relationship is applicable for the reaction involving tribasic acids.

To illustrate the validity of these equations, 50 grams of monoethyanolamine were reacted with glacial acetic acid according to equation (1). Theoretically the equation would predict that 49.2 grams of acid would be required. An actual experimentation utilized 48.5 grams of acid. The difference is well within the experimental error of the synthesis.

Applying equation (1) to the monoethyanolamine-acetic acid reaction, it is noted that $$n = 2$$
$$X = CH_2-CH_2-OH$$
$$A = CH_2-COOH$$

Rewriting equation (1) in terms of this example to determine the formula for the conducting salt.

$$NH_2X + HA = ANH_3X$$

A similar test was conducted to establish the validity of equation (2). Forty (40) grams of triethanolamine were reacted with adipic acid. The equation theoretically predicts that 20 grams of the acid will be required, while 22 grams were actually used in an experimentation. Again this difference on correspondence is within the experimental error of the synthesis.

Applying equation (2) to the triethanolamine-adipic acid reaction wherein $$n = 0$$
$$X = CH_2-CH_2-OH$$
$$A = (CH_2)_4(COOH)_2$$

The formula for the resulting conducting salt can be determined as $$2NX_3 + H_2A = A(NHX_3)_2$$

The salts formed are simple adducts and unlike the conventional neutralization reaction, no water is formed. It is this characteristic which permits the solvent to function as a desirable reaction media for the acid and base.

The conductive salts on dissolution in an appropriate solvent confer substantially improved properties thereon relative to conventionally employed electrolytes. Foremost among these em improvements is the resulting lower vapor pressure at elevated temperatures. For example, at 125° C., electrolytes of the present invention containing a conductive salt as hereinbefore described exhibit vapor pressures from about 100 to 200 mm. Hg less than electrolytes containing conventional ammonium salt in ionogens. Other significant improvments include enhanced chemical stability at elevated temperatures, controlled water content for maximum scintillation voltage, minimum reactivity with aluminum Al and $Al_2O_3$ and inhibition of corrosion of Al and degradation of $Al_2O_3$ through the use of a buffering system to maintain pH.

In order to demonstrate the effectiveness of the electrolytes of the present invention for use in electrolytic capacitors numerous possible electrolytes were prepared and resistivity measurements made thereon. Electrolytes exhibiting resistivity of less than 3,500 ohm-cm. are considered appropriate for commercial applications, and those having a resistivity of 300-2,500 ohm-cm. are particularly desirable. The following examples are illustrative of the present invention:

EXAMPLE I

The effect of the conductive salt composition and concentration on the 25° C. resistivity of a solvent comprising a mixture of 75 percent by volume dimethylformamide and 25 percent by volume ethylene glycol is shown in table I for a wide range of conductive salts. Capacitors utilizing these electrolytes are generally operable in the temperature range from about 55° C. to 125° C.

EXAMPLE II

The effect of the conductive salt composition and concentration on the 25° C. resistivity of a solvent comprising a mixture of 100 parts ethylene glycol and 3 parts water is shown in table II. The resistivities are noted for conductive salt concentrations of 5 grams and 10 grams respectively per 103 grams of solvent. Capacitors utilizing these electrolytes are generally useful in the temperature range from about 20° C. to 85° C.

TABLE I

| Salt of— | Concentration of grams of salt per 100 grams of solvent | Resistivity, ohm-cm. at 25° C. |
| --- | --- | --- |
| Monoethanolamine and malonic acid | 2 | 992 |
|  | 4 | 702 |
|  | 6 | 561 |
|  | 8 | 524 |

| Salt of— | Concentration of grams of salt per 100 grams of solvent | Resistivity, ohm-cm. at 25° C. |
|---|---|---|
| Monoethanolamine and succinic acid | 2<br>4<br>6 | 2,356<br>1,506<br>1,179 |
| Monoethanolamine and tartaric acid | 2<br>4<br>6<br>8 | 1,342<br>920<br>827<br>780 |
| Monoethanolamine and citric acid | 2<br>4<br>6 | 1,716<br>1,248<br>1,076 |
| Diethanolamine and malic acid | 2<br>4<br>6<br>8 | 1,529<br>1,023<br>836<br>743 |
| Diethanolamine and succinic acid | 2<br>4<br>6<br>8 | 1,872<br>1,164<br>967<br>855 |
| Diethanolamine and citric acid | 2<br>4<br>6 | 2,146<br>1,462<br>1,260 |
| Diethanolamine and tartaric acid | 2<br>4<br>6<br>8 | 1,742<br>1,291<br>995<br>865 |
| Diethanolamine and citric acid | 2<br>4<br>6 | 2,146<br>1,462<br>1,260 |
| N-methyl diethanolamine and oxalic acid | 2<br>4<br>6<br>8 | 1,757<br>1,144<br>908<br>871 |
| N-methyl diethanolamine and tartaric acid | 2<br>4<br>6<br>8 | 1,648<br>1,135<br>840<br>756 |
| Triethanolamine and tartaric acid | 2<br>4<br>6<br>8 | 2,099<br>1,331<br>1,135<br>995 |
| Triethanolamine and citric acid | 2<br>4<br>6<br>8 | 2,488<br>1,570<br>1,213<br>1,057 |
| N-methyl diethanolamine and malonic acid | 2<br>4<br>6<br>8 | 1,602<br>970<br>746<br>638 |
| Diethanolamine and oxalic acid | 2<br>4<br>6<br>8 | 1,829<br>1,211<br>1,017<br>904 |
| Diethanolamine and malonic acid | 2<br>4<br>6<br>8 | 2,988<br>1,873<br>1,486<br>1,292 |
| Dimethyl ethanolamine and succinic acid | 2<br>4<br>6<br>8 | 953<br>598<br>468<br>407 |
| Dimethyl ethanolamine and tartaric acid | 2<br>6<br>8 | 1,156<br>598<br>517 |
| Dimethyl ethanolamine and oxalic acid | 2<br>4<br>6<br>8 | 1,008<br>672<br>546<br>478 |
| Triethanolamine and phosphoric acid | 2<br>4<br>6<br>8 | 3,111<br>2,110<br>1,802<br>1,602 |
| N-methyl diethanolamine and phosphoric acid | 2<br>4<br>6 | 2,372<br>1,786<br>1,509 |
| Diethanolamine and phosphoric acid | 2<br>4<br>6 | 3,172<br>2,325<br>1,940 |
| Triethanolamine and boric acid | 2<br>6 | 4,028<br>2,587 |
| Monoethanolamine and adipic acid | 2<br>4<br>6<br>8 | 1,663<br>1,124<br>902<br>795 |
| N-aminoethylethanolamine and succinic acid | 2<br>6 | 3,542<br>2,007 |
| N,N dimethylethanolamine and adipic acid | 2<br>4<br>6<br>8 | 1,910<br>1,170<br>924<br>785 |
| N-methyldiethanolamine and phosphoric acid | 2<br>4<br>8 | 10,533<br>5,652<br>3,388 |
| Diethanolamine and adipic acid | 2<br>4<br>6<br>8 | 2,495<br>1,617<br>1,300<br>1,133 |
| N,N dimethylethanolamine and citric acid | 2<br>4<br>6<br>8 | 1,232<br>739<br>585<br>508 |
| Triethanolamine and adipic acid | 2<br>4<br>6 | 5,174<br>3,018<br>2,264 |
| N-methyl diethanolamine and adipic acid | 2<br>4<br>6<br>8 | 2,786<br>1,668<br>1,262<br>1,066 |
| N-methyl diethanolamine and succinic acid | 2<br>4<br>6<br>8 | 1,679<br>984<br>774<br>654 |
| N,N dimethylethanolamine and malic acid | 2<br>4<br>6<br>8 | 929<br>612<br>482<br>413 |
| N-aminoethyl ethanolamine and adipic acid | 2<br>4<br>6<br>8 | 5,332<br>3,354<br>2,469<br>2,253 |
| N-methyl diethanolamine and citric acid | 2<br>4<br>6<br>8 | 1,720<br>1,135<br>929<br>774 |
| N-methyl diethanolamine and propionic acid | 2<br>4<br>6<br>8 | 2,288<br>1,428<br>1,101<br>946 |
| N-aminoethyl ethanolamine and propionic acid | 2<br>4<br>6<br>8 | 1,823<br>1,128<br>881<br>750 |
| N-aminoethyl ethanolamine and acetic acid | 2<br>4<br>6<br>8 | 1,342<br>843<br>654<br>564 |
| Diethanolamine and propionic acid | 2<br>4<br>6<br>8 | 2,236<br>1,404<br>1,101<br>712 |
| N-aminoethyl ethanolamine and malonic acid | 2<br>4<br>6<br>8 | 1,968<br>1,216<br>941<br>838 |
| Tetramethylguanidine and phosphoric acid | 2<br>4 | 1,081<br>688 |
| Tetramethylguanidine and succinic acid | 2<br>4 | 720<br>410 |
| Tetramethylguanidine and tartaric acid | 2<br>4 | 776<br>477 |
| Tetramethylguanidine and citric acid | 2<br>4 | 862<br>511 |
| Tetramethylguanidine and malic acid | 2<br>4 | 702<br>421 |

| Salt of— | Concentration of grams of salt per 100 grams of solvent | Resistivity, ohm-cm. at 25° C. |
|---|---|---|
| Piperidine and adipic acid | 2 | 1,133 |
|  | 4 | 733 |
|  | 6 | 585 |
|  | 8 | 508 |
| Tetramethylguanidine and adipic acid | 2 | 918 |
|  | 4 | 557 |
|  | 6 | 431 |
| Monoisopropanolamine and citric acid | 2 | 1,254 |
|  | 4 | 819 |
|  | 6 | 675 |
|  | 8 | 602 |
| Monoisopropanolamine and adipic acid | 2 | 1,210 |
|  | 4 | 819 |
|  | 6 | 675 |
|  | 8 | 605 |
| Piperidine and tartaric acid | 2 | 1,152 |
|  | 4 | 752 |
|  | 6 | 601 |
| Piperidine and oxalic acid | 2 | 1,359 |
|  | 4 | 898 |
|  | 6 | 734 |
|  | 8 | 644 |
| Piperidine and succinic acid | 2 | 702 |
|  | 4 | 483 |
| Monoisopropanolamine and succinic acid | 2 | 926 |
|  | 4 | 660 |
|  | 6 | 557 |
|  | 8 | 505 |

TABLE II

| Salt of— | Ohms/cm. resistivity for— | |
|---|---|---|
|  | 5 grams | 10 grams |
| Monoethanolamine, formic acid | 2,019 | 1,215 |
| Triethanolamine, formic acid | 1,292 | 733 |
| N-aminoethyl ethanolamine, formic acid | 4,264 | 2,423 |
| N-methyldiethanolamine, formic acid | 843 | 497 |
| Diethanolamine, acetic acid | 1,615 | 988 |
| N-methyl diethanolamine, acetic acid | 1,163 | 698 |
| Monoethanolamine, propionic acid | 1,744 | 1,040 |
| Diethanolamine, propionic acid | 2,267 | 1,417 |
| N-aminoethyl ethanolamine, propionic acid | 2,196 | 1,350 |
| N-methyl diethanolamine, propionic acid | 1,481 | 876 |
| Triethanolamine, oxalic acid | 1,512 | 1,344 |
| NN-dimethyl ethanolamine, oxalic acid | 1,005 | 589 |
| Monoethanolamine, malonic acid | 1,014 | 580 |
| N-aminoethyl ethanolamine, malonic acid | 3,617 | 2,786 |
| N-methyl diethanolamine, malonic acid | 1,520 | 924 |
| NN-dimethyl ethanolamine, succinic acid | 1,082 | 727 |
| N-aminoethyl ethanolamine, succinic acid | 4,025 | 2,383 |
| N-methyl diethanolamine, succinic acid | 1,421 | 875 |
| Tetramethyl guanidine, succinic acid | 1,063 | 620 |
| Monoethanolamine, malic acid | 1,734 | 1,032 |
| Diethanolamine, malic acid | 1,576 | 985 |
| Triethanolamine, malic acid | 1,809 | 1,221 |
| NN-dimethyl ethanolamine, malic acid | 1,143 | 701 |
| N-methyl diethanolamine, malic acid | 1,309 | 888 |
| Monoethanolamine, tartaric acid | 1,244 | 814 |
| NN-dimethyl ethanolamine, tartaric acid | (1) | 729 |
| N-methyl diethanolamine, tartaric acid | 1,880 | 1,124 |
| Piperidine, tartaric acid | 1,404 | 819 |
| Tetramethyl guanidine, tartaric acid | 1,439 | 840 |
| NN-dimethyl ethanolamine, citric acid | 1,664 | (1) |
| N-methyl diethanolamine, citric acid | 2,270 | 1,445 |
| Piperidine, citric acid | 1,510 | 898 |
| Tetramethyl guanidine, citric acid | 1,483 | 853 |
| Monoisopropanolamine, citric acid | 1,088 | 660 |
| Monoethanolamine, phosphoric acid | 1,502 | 969 |
| Diethanolamine, phosphoric acid | 2,460 | 1,617 |
| Triethanolamine, phosphoric acid | 3,011 | (1) |
| N-methyl diethanolamine, phosphoric acid | 2,270 | 1,386 |
| Tetramethyl guanidine, phosphoric acid | 1,546 | 895 |
| Monoisopropanolamine, phosphoric acid | 1,350 | 833 |
| Monoethanolamine, adipic acid | 1,835 | 1,030 |
| Diethanolamine, adipic acid | 2,455 | 1,583 |
| Triethanolamine, adipic acid | 3,028 | (1) |
| NN-dimethyl ethanolamine, adipic acid | 1,483 | 912 |
| N-aminoethyl ethanolamine, adipic acid | 4,974 | 2,972 |
| N-methyl diethanolamine, adipic acid | 1,544 | 946 |
| Piperidine, adipic acid | 1,152 | 681 |
| Tetramethyl guanidine, adipic acid | 1,586 | 924 |
| Monoisopropanolamine, adipic acid | 1,060 | 626 |
| Piperidine, lactic acid | 1,098 | 652 |

[1] No data.

EXAMPLE III

Twenty (20) grams of monoethyanolamine were reacted with 14.3 grams of nitric acid. Water was utilized as a mutual solvent for the reactants and excess water was removed by heating. An electrolyte consisting of 2 percent by weight of the reaction product conductive nitrate salt and 98 percent by weight dimethylformamide exhibited a resistivity of 285 ohm-cm. at 25° C. A 4 percent solution has a resistivity of 188 ohm-cm.

EXAMPLE IV

Twenty (20) grams of triethanolamine were reacted with 8.4 grams of nitric acid to form the conductive nitrate. A 4 percent by weight solution of the nitrate in dimethylformamide has a resistivity of 25 ohm-cm.

EXAMPLE V

Twenty (20) grams of N-methyl diethanolamine were reacted with 10 grams of nitric acid to form the conductive nitrate.

In a water solvent, this conductive salt gave the following resistivities:

| Percent by weight conductive salt: | Resistivity, ohm-cm. |
|---|---|
| 2 | 136 |
| 4 | 74 |
| 10 | 35 |

In a dimethylformamide solvent, the conductive salt gave the following resistivities:

| Percent by weight conductive salt: | Resistivity, ohm-cm. |
|---|---|
| 2 | 369 |
| 4 | 231 |
| 6 | 127 |

EXAMPLE VI

Seventeen and one-half (17.5) grams monoisopropanolamine were reacted with 18 grams of nitric acid to form the conductive nitrate. In a dimethylformamide solvent, the following resistivities were noted:

| Percent by weight conductive salt: | Resistivity, ohm-cm. |
|---|---|
| 2 | 273 |
| 4 | 183 |
| 5 | 160 |

EXAMPLE VII

Twenty (20) grams of piperidine were reacted with 21.9 grams of nitric acid to form the conductive nitrate. In a dimethylformamide solvent, the following resistivities were noted:

| Percent by weight conductive salt: | Resistivity, ohm-cm. |
|---|---|
| 2 | 284 |
| 4 | 200 |
| 6 | 153 |

It is especially noteworthy that the pH of nitrate salts are close to 7.0. When using nonaqueous solvents the pH must be kept as close to 7.0 as possible and the water content must be kept low to prevent degradation of the electrolyte by hydrolysis.

Preferred salts, in accordance with the present invention, are generally those having low molecular weight and high dissociation constant. This is because low molecular weight, high dissociation constant salts may be utilized in low concentrations thus contributing to electrolytes having low viscosity and high conductivity per ion in solution. Generally preferred organic basis are the alkanolamines and the substituted alkanolamines and in particular N-methyl ethanolamine and monoethanolamine. Particularly favored acids include adipic acid, succinic acid and boric acid.

While the present invention has been described with reference to particular embodiments thereof, it will be understood that numerous modifications can be made by those skilled in the art without actually departing from the scope of the invention.

We claim:

1. An electrolyte for electrolytic capacitors essentially comprising a nonaqueous solvent and a conducting adduct dissolved therein, said adduct consisting of the reaction product of a nitrogen-containing organic base and an acid selected from the group consisting of di and tri carboxylic organic acids.

2. An electrolyte as claimed in claim 1 wherein said acid is selected from the group consisting of adipic and succinic acids.

3. An electrolyte as claimed in claim 1 wherein said nitrogen-containing organic base is selected from the group consisting of the alkanolamines, substituted alkanolamines, tetramethyl guanidine and piperidine.

4. An electrolyte as claimed in claim 3 wherein said nitrogen-containing organic base is selected from the group consisting of the alkanolamines and the substituted alkanolamines.

5. An electrolyte according to claim 4, said nitrogen-containing organic base being selected from the group consisting of N-methyl ethanolamine and methanolamine.

6. An electrolyte as claimed in claim 5 wherein the concentration of the conducting adduct is from about 4 to about 10 percent by weight.

7. An electrolyte as claimed in claim 1 wherein the concentration of the conducting adduct is from about 0.1 to about 25 percent by weight.

8. An electrolytic capacitor comprising a pair of electrodes, at least one of said electrodes being composed of a film-forming metal having a dielectric film thereon, and an electrolyte comprising a nonaqueous solvent and a conducting adduct dissolved therein, said adduct consisting of the reaction product of a nitrogen-containing organic base and an acid selected from the group consisting of di and tri carboxylic organic acids, and being capable of supporting the formation of said dielectric film.

9. An electrolytic capacitor as claimed in claim 8, wherein said acid is selected from the group consisting of adipic and succinic acids.

10. An electrolytic capacitor as claimed in claim 8, wherein said nitrogen-containing organic base is selected from the group consisting of the alkanolamines, substituted alkanolamines, tetramethyl guanadine and piperidine.

11. An electrolytic capacitor as claimed in claim 10, wherein said organic base is selected from the group consisting of the alkanolamines and substituted alkanolamines.

12. An electrolytic capacitor, as claimed in claim 8, wherein the concentration of the conducting adduct is from about 0.1 to about 25 percent by weight.

13. An electrolytic capacitor, as claimed in claim 12, wherein the concentration of the conducting adduct is from about 4 to about 10 percent by weight.

14. A capacitor according to claim 8, said electrolyte containing an adduct selected from the group alkanolamine adipate and alkanolamine succinate.